(12) United States Patent
Cook et al.

(10) Patent No.: US 6,865,791 B2
(45) Date of Patent: Mar. 15, 2005

(54) METHOD OF GENERATING FORCE BETWEEN A STRUCTURE AND AN ADDITIONAL MEMBER

(75) Inventors: John Cook, Sevenoaks (GB); Lakshman Chandrasekaran, Farnborough (GB)

(73) Assignee: Qinetiq Limited, Farnborough (GB)

( * ) Notice: Subject to any disclaimer, the term of this patent is extended or adjusted under 35 U.S.C. 154(b) by 0 days.

(21) Appl. No.: 10/275,386

(22) PCT Filed: May 8, 2001

(86) PCT No.: PCT/GB01/01977

§ 371 (c)(1),
(2), (4) Date: Nov. 5, 2002

(87) PCT Pub. No.: WO01/86096

PCT Pub. Date: Nov. 15, 2001

(65) Prior Publication Data

US 2003/0126828 A1 Jul. 10, 2003

(30) Foreign Application Priority Data

May 10, 2000 (GB) .............................. 0011153

(51) Int. Cl.$^7$ ................................................ B23P 11/02
(52) U.S. Cl. ........................... 29/447; 29/452; 148/563; 148/402; 403/273; 403/365; 403/372; 52/653.2
(58) Field of Search ........................ 29/447, 451, 452, 29/877.1, 877.34, 506, 507, 508, 234, 282; 148/563, 675, 669, 402; 403/273, 365, 372, 373, 404; 52/653.2

(56) References Cited

U.S. PATENT DOCUMENTS

| | | | | |
|---|---|---|---|---|
| 4,111,575 A | * | 9/1978 | Hoshino | 403/104 |
| 5,120,175 A | * | 6/1992 | Arbegast et al. | 411/501 |
| 5,305,656 A | * | 4/1994 | Kamiya et al. | 74/604 |
| 5,400,827 A | * | 3/1995 | Baro et al. | 138/98 |
| 5,507,826 A | * | 4/1996 | Besselink et al. | 623/22.29 |
| 5,687,995 A | * | 11/1997 | Mori et al. | 285/381.2 |
| 5,895,079 A | * | 4/1999 | Carstensen et al. | 285/333 |

FOREIGN PATENT DOCUMENTS

| | | | |
|---|---|---|---|
| DE | 42 43 213 C1 | 1/1994 | |
| EP | 0 470 902 A1 | 2/1992 | |
| EP | 911482 A2 * | 4/1999 | ........... E21B/17/01 |
| GB | 1 594 573 | 7/1981 | |
| JP | 5-209697 | 8/1993 | |
| WO | 96/12588 A | 5/1996 | |

OTHER PUBLICATIONS

Patent Abstracts of Japan; vol. 1998, No. 09, Jul. 31, 1998; & JP 10 088738 A, Apr. 7, 1998.
Patent Abstracts of Japan, vol. 018, No. 530, Oct. 6, 1994; & JP 06 186376 A; Jul. 8, 1994.
Patent Abstracts of Japan, vol. 015, No. 466; Nov. 26, 1991; & JP 03 199997 A, Aug. 30, 1991.

* cited by examiner

Primary Examiner—David P. Bryant
Assistant Examiner—Jermie E. Cozart
(74) Attorney, Agent, or Firm—Nixon & Vanderhye P.C.

(57) ABSTRACT

A method of generating force between a structure and an additional member, particularly for reinforcing an existing structure so that an additional member can share existing load. Pre-cooled or pre-heated shims of shape memory alloy (SMA) are inserted between the additional member and the existing structure, or between different sub-units of the additional member, or between the additional member and shoes fixed for this purpose to the existing structure. On subsequent warming or cooling the SMA shims expand to apply compressive forces to the portions of the structure, additional member or shoe(s) with which they are in contact on their opposite sides. Further compressive, tensile, flexural or torsional forces will be developed within other parts of the structure and additional member as a result of the shim expansion depending on the particular arrangement. Alternatively the SMA may be of a type which expands when warmed above ambient temperature and remains in the expanded state despite cooling back to ambient.

26 Claims, 16 Drawing Sheets

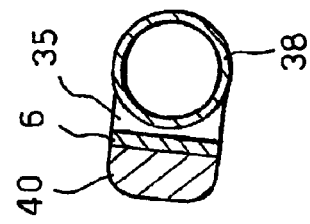
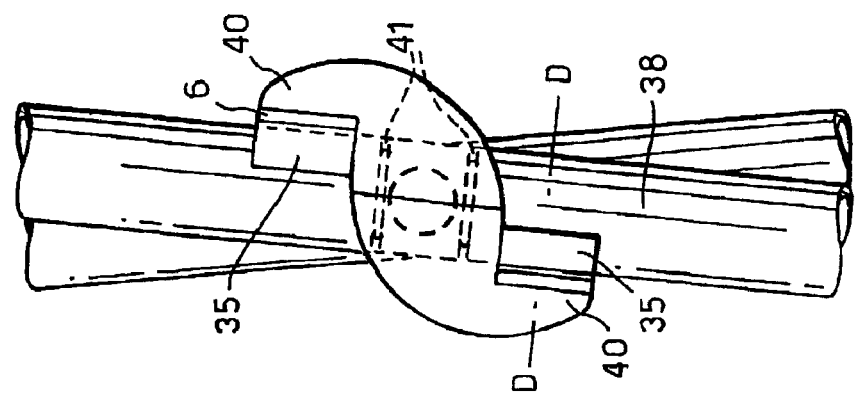
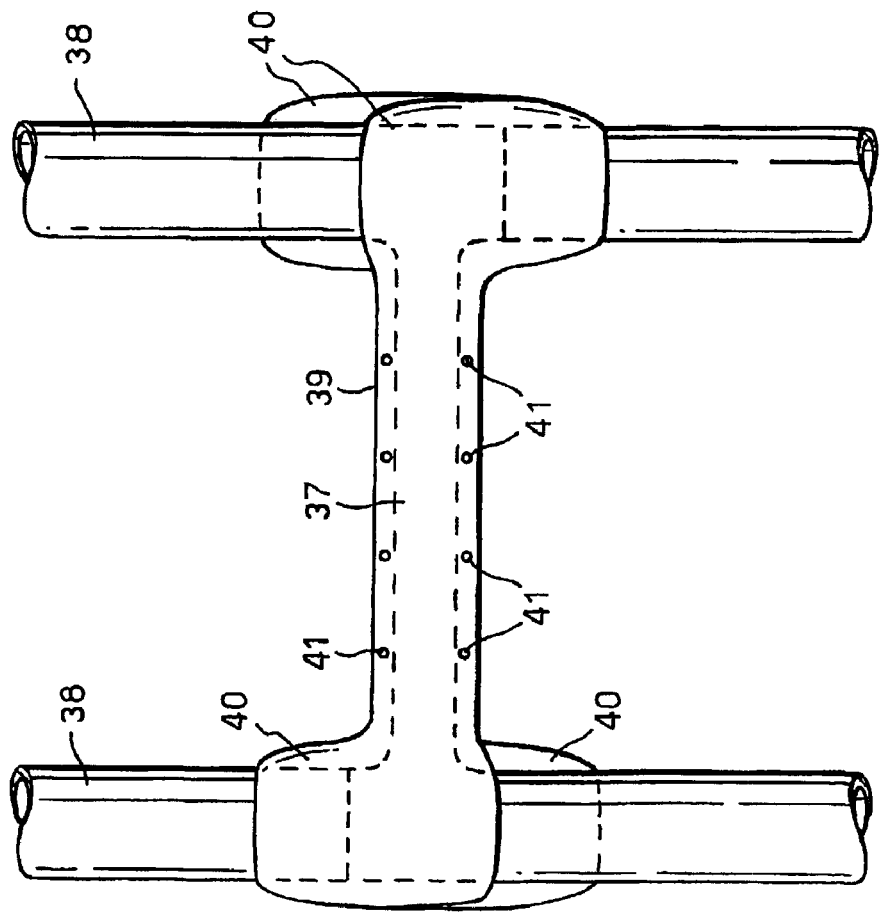

METHOD OF GENERATING FORCE BETWEEN A STRUCTURE AND AN ADDITIONAL MEMBER

This application is the US national phase of international application PCT/GB01/01977 filed 8 May 2001, which designated the US.

BACKGROUND OF THE INVENTION

This invention relates to a method of reinforcing structures and has particular but not exclusive application to reinforcing offshore structures such as oil and gas rigs.

It is often required to increase the load that existing structures such as oil rigs can carry. Typically such structures are constructed from large steel tubes.

One way of reinforcing the structure is by welding on new structures or additional members. However, for a structure that is already close to its loading limit there is a fundamental difficulty that only the additional load that is subsequently applied can be shared by the new structure; the existing load will be carried entirely by the existing structure. One way to avoid this difficulty is to remove all or part of the load when carrying out the retrofit. Upon re-loading, the new structure will take a greater share of the overall load than it would if the load could not be removed. Normally, for large structures, there is limited scope for removing load, so that optimum load sharing is not achievable. Consequently, the scope for carrying additional load may be very limited.

In addition, in the case of oil and gas rigs that are required to remain operational throughout any retrofits, welding or other operations involving the use of naked flames, are not allowable.

SUMMARY OF THE INVENTION

It is an object of the invention to provide a method of reinforcing structures without the need to remove the load and that obviates the necessity of welding and which furthermore allows for the existing load to be shared by new additional structures or members.

The invention comprises a method of reinforcing a structure with an additional member, said additional member comprising one or more sub-units comprising the steps of: a) inserting pre-cooled or pre-heated shims of shape memory alloy between said member and said structure or between at least two of said sub-units; b) allowing said shims to expand on subsequent cooling or warming so as to force said member into compression or tension against said structure, also driving an adjacent portion of said structure into tension or compression. Shape memory alloys are also possible in which the transition temperature changes after activation. A shim made from such an alloy could be inserted at ambient temperature, caused to expand by heating, and remain in the expanded state on cooling to ambient temperature and below. Such an alloy is Ti—Ni—Nb.

BRIEF DESCRIPTION OF DRAWINGS

The invention will be described with reference to the following figures of which:

FIGS. 11a to c show how a member subject to torsional loading can be reinforced using the techniques described.

DETAILED DESCRIPTION OF PREFERRED EMBODIMENTS

Figure 1A:
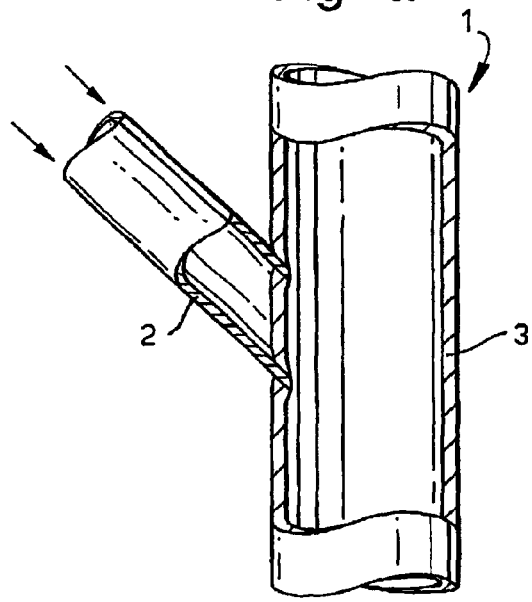
FIGS. 1a to e show how the intersection between hollow tubes can be reinforced according to one embodiment of the invention.

FIG. 1a shows schematically one of the most common failure modes (shear failure) in a structure 1. This is caused by punching through of a diagonal strut 2 to a vertical hollow member 3. One solution would be to fill the large tube with concrete or other appropriate material. However this would render the whole structure uninspectable from the inside. In addition as the enhanced load is transferred to the vertical tube after installation of the retrofit, the diameter thereof would increase due to Poissons ratio. Thus the inside wall would lose contact with the concrete, so much of the support would be lost.

Figure 1B:
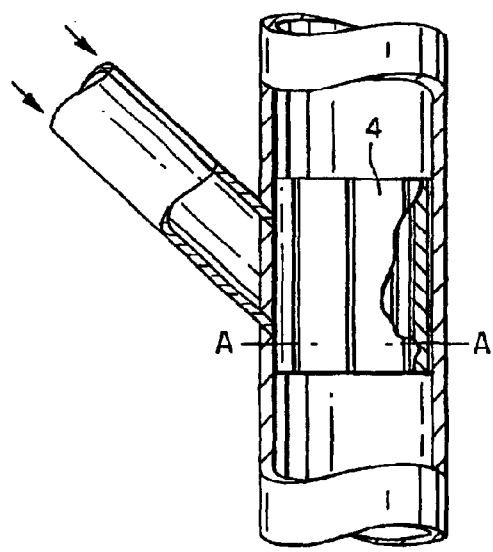
Figure 1C:
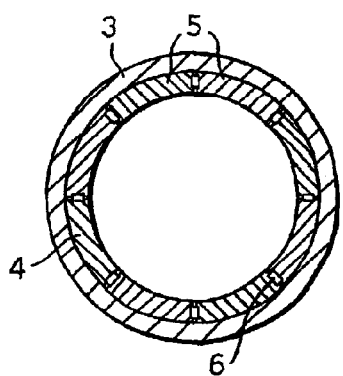
Figure 1D:
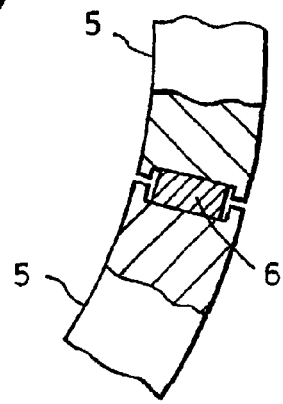

In the FIG. 1b embodiment of the invention, the problem is solved by insertion of a supporting ring 4 which is installed inside the vertical tube as seen in FIG. 1b. FIG. 1c shows a cross-section through A—A of FIG. 1b. The support ring comprises a number of steel segments 5, between each segment is inserted a pre-cooled shape memory alloy shim 6, as seen in FIG. 1d. For example, these shims might be formed and stored in liquid nitrogen. After warming up the shims expand (shown in FIG. 1e) and the diameter of the supporting ring therefore increases, forming an interference fit within the vertical member 3. As the supporting ring (comprising a number of items 5 and 6) is compressively loaded around the circumference, a ring of discrete segments can suffice. In effect, the supporting ring acts as an internal clamp. Normal thermal expansion of materials is insufficient to provide the necessary displacements for this mechanism to operate effectively.

Figure 1E:
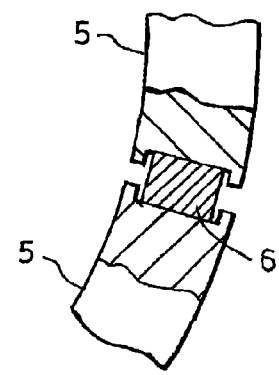

In FIGS. 1c to e the shims are shown as having constant thickness, but wedge shaped, gently curved or other shaped shims may also be used according to the situation.

It would be clear to the skilled person that the number, size and thickness and choice of materials can be made according to the exact requirement.

Shape memory alloys are a class of metallic alloys that have the ability to undergo an apparent plastic transformation at lower temperature which can be recovered on heating above a certain temperature. These include alloys based on the systems Ti—Ni, Cu—Zn—Al, Cu—Al—Ni, and Ti—Ni—Nb but are not limited to these systems. One such alloy comprises 44 atomic % Ti, 47 atomic % Ni and 9 atomic % Nb.

In the above descriptions the term "shim" has been referred to. In the remainder of this specification, this term should be construed as including the term "spacer". Such a shim may also comprise a stack of sheets.

Figure 2A:
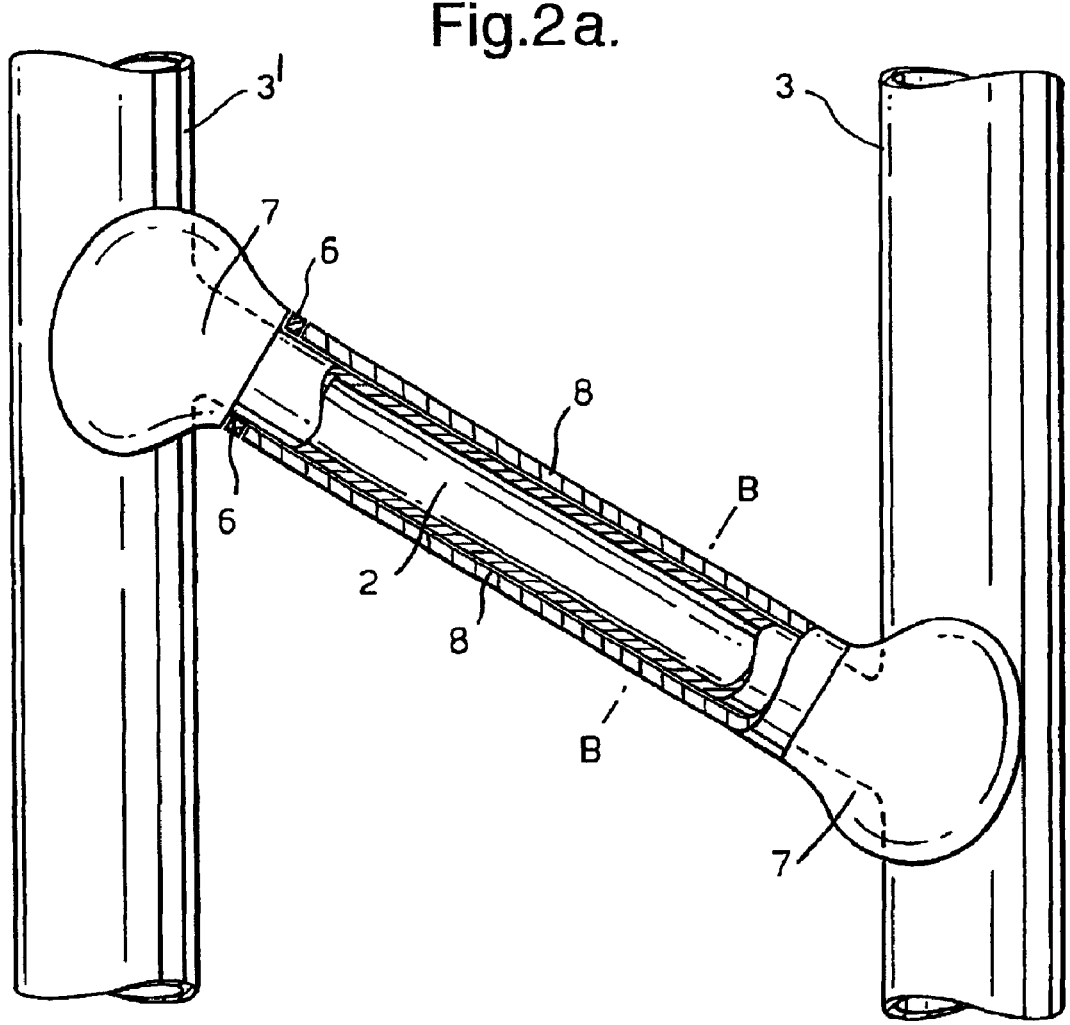
FIGS. 2a to c show how an additional reinforcing member can be attached to a pre-existing structure to share loading.

FIG. 2 shows an alternative example of how an existing structure can be reinforced by additional members to take a share of the existing as well as an extra load. The diagram shows a portion of a structure including two existing large vertical members 3 and an existing diagonal member 2. It is assumed in this example that member 2 is the weakest part of the structure and requires reinforcement. In order to reinforce the structure shoes 7 are fixed, by appropriate means such as bolting on, onto the main tubes at each end in the region of the diagonal member. An auxilliary member 8 comprising two half tubes is bolted together around the diagonal member. A cooled shape memory alloy shim 6 is then inserted between the auxilliary member and one of the shoes. On expansion when becoming warm, the additional auxilliary member (comprising the half tubes) are then driven into axial compression, thereby relieving some of the compressive load in the existing member. It is often only necessary to apply the SMA shims at one end or other of the member. For large structures it will normally be most convenient to insert these at the upper end of the member where the gap will naturally occur with the auxiliary member resting on its lower end. However, there may be circumstances in which it is more convenient to use a shim at each end of the auxiliary member. An example of this is where by using a thin shim at each end the heat transfer from the structure, and hence the activation of the SMAs, is speeded up.

Figure 2B:
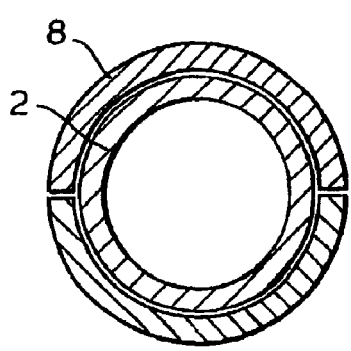
Figure 2C:
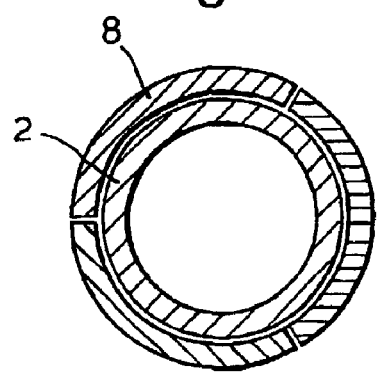

The auxiliary member 8 can consist of more than two pieces if this is more convenient for lifting into place and assembly. For example it might consist of three pieces. FIGS. 2b and 2c are sections through B—B showing two and three piece versions. The assembly of old member surrounded by the new members may also be constrained radially by an overwind, bandage or series of circumferential clips in order to stabilise it against buckling.

FIG. 3 shows alternative examples of how a tubular member 9 can be reinforced. In the FIG. 3a embodiment an additional sleeve 10 is inserted around the member and cooled SMA shims (spacers) 6 are inserted between the existing tube and additional sleeve. On warming the shims will force the existing tube member into compression. This is a method of either providing additional reinforcement against internal pressure loading or as a means of tightly clamping on a collar capable of withstanding a high load applied along the axis of the existing tube member.

Figure 3A:
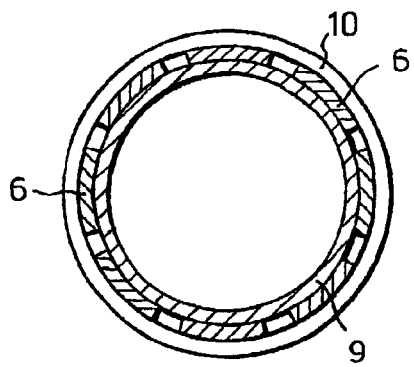
FIGS. 3a to f show alternative embodiments of how an existing member can be reinforced by external clamping.
Figure 3B:
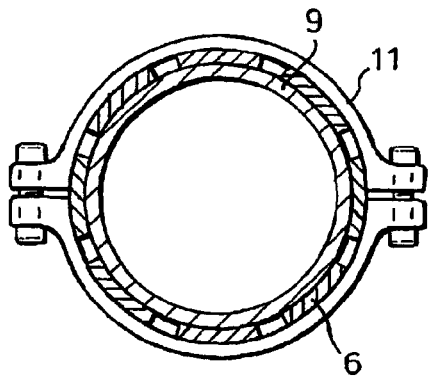

FIG. 3b shows a similar embodiment wherein instead of a sleeve, a bracelet/clamp arrangement 11 is fixed around existing tube 9. On warming the SMA shims expand so as to force the existing tube of the structure into hoop compression and the bracelet into tension. On a large structure, the clamping forces developed can be larger than would be achievable by simply tightening the screws.

Figure 3C:
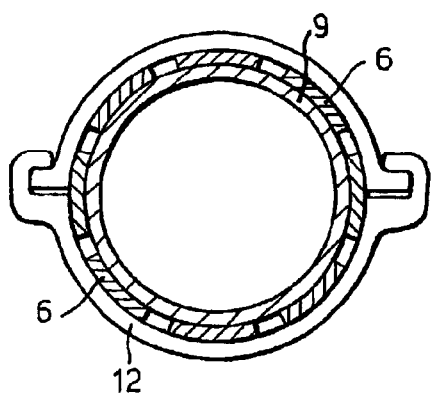

FIG. 3c shows a similar embodiment wherein the clamp comprises two overlapping portions 12. This has some advantage over the FIG. 3b embodiment as it can take more tension than that sustainable by the bolts of the FIG. 3b bracelet.

Figure 3D:
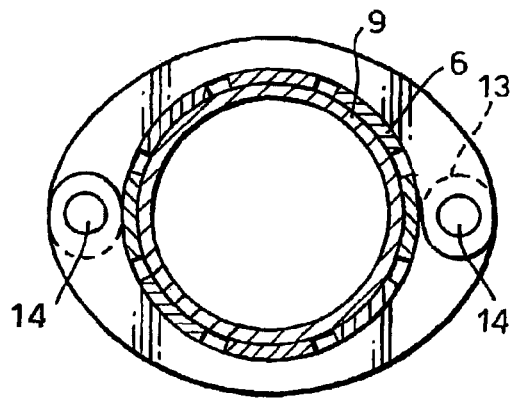

FIG. 3d shows an alternative embodiment in which the parts of the clamp are held together by pins. The two parts of the clamp are interleaved where they overlap 13 and a pin 14 is inserted through the holes. This arrangement is capable of achieving a very strong clamp. If a longer clamp is needed, that is one extending further along the length of the member 9, further interleaving is clearly possible. The idea of frequent interleaving is to ensure that the pins are loaded in shear rather than in bending.

Figure 3E:
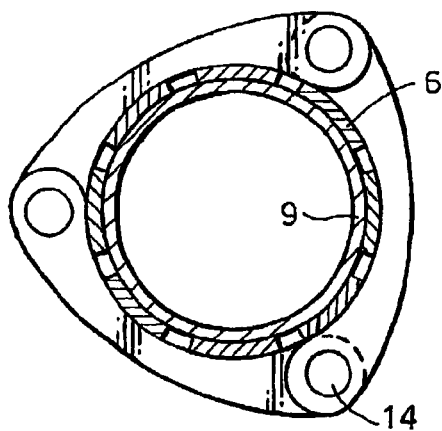
Figure 3F:
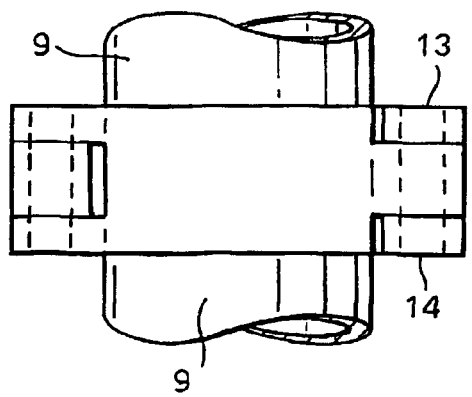

FIGS. 3e and f show an arrangement with three clamp pieces and three pins 14. This may be more convenient for lifting into position and for accommodating non-circularity in the tube to be clamped. Clearly clamp arrangements consisting of even more components are possible.

Figure 4:
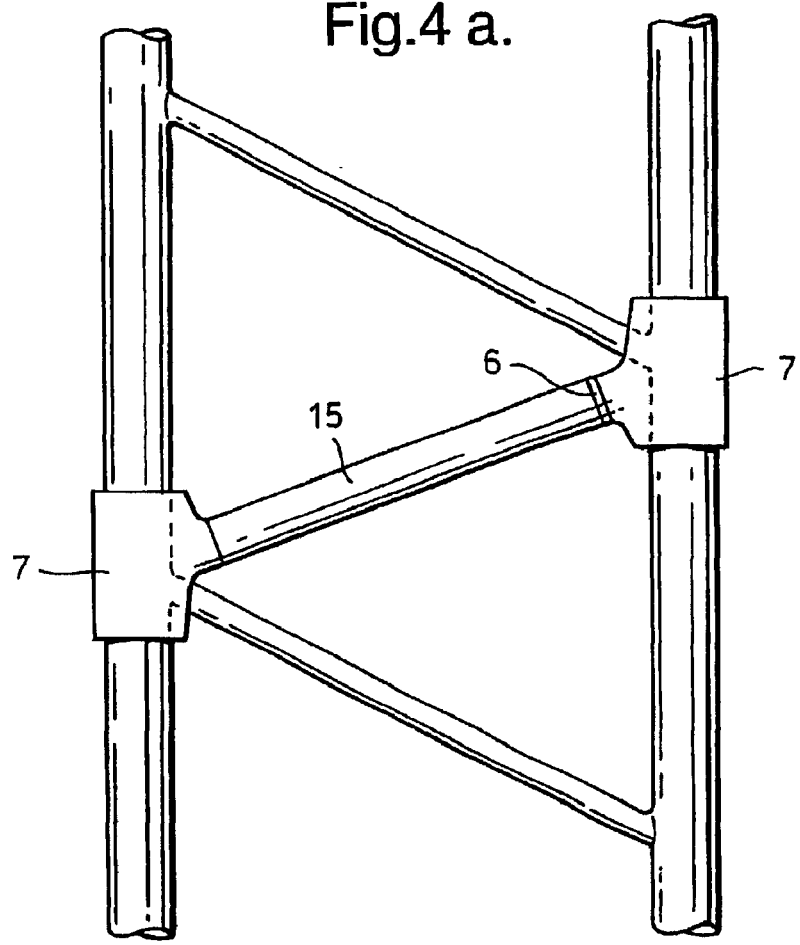
FIGS. 4a and b show how an entirely new member can be introduced in such a way as to share some existing load within the structure or to carry load that was previously carried by a bent or damaged member.
Figure 4:
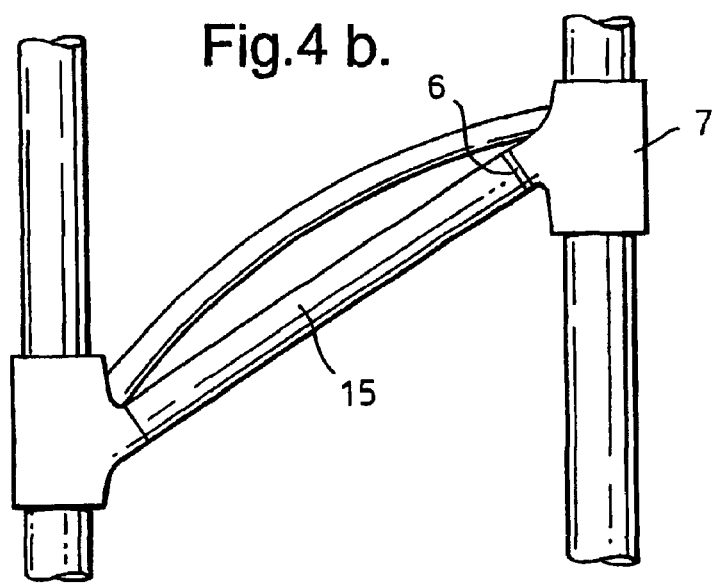

It should be noted that additional members 15 (see FIG. 4a) can be added to reinforce a structure at any suitable location even where a member does not already pre-exist, and the expanding shim principle used to transfer load into such additional members. In the above example of FIG. 2, if there was not already a pre-existing diagonal member, one could be added by having shoes fitted on to the two vertical tubes and then inserting the additional diagonal member between the shoes. Cooled shape memory alloy shims would then be inserted between the shoes and the ends of the additional member. On warming the member will be driven into a state of axial compression allowing it to take the desired portion of the pre-existing load. This is shown in FIG. 4a.

In another simple embodiment the additional member can be inserted between portions of the existing structure to relieve the load in a bent or otherwise damaged member. On warming up the shim will expand to force the additional member into compression against the structure. Again appropriately shaped shoes which snugly fit the portion of structure and end of the additional member may be advantageously required. This is shown in FIG. 4b.

Figure 5:
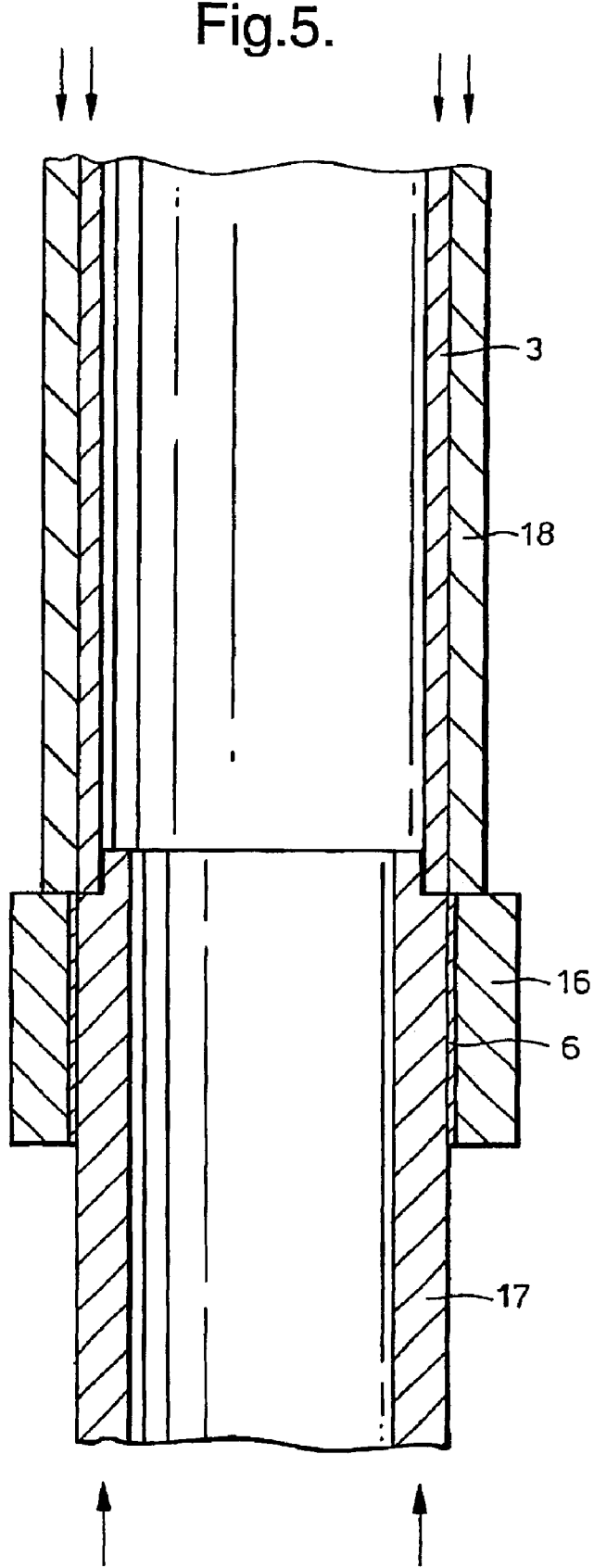
FIG. 5 shows how load can be transferred into a thick member in order to allow reinforcement elsewhere in the structure.

The external clamps of the type shown in FIGS. 3b to f may be used for load transfer into a main member. FIG. 5 shows the method by which reinforcement can be given to a relatively thin member 3 mounted on a thick member 17. A ring of SMA shims 6 is clamped 16 to the thick member 17. In this example, compressive load might be transferred into the auxiliary member 18 by means of SMA shims (not shown) at its upper end, in order to share load with the vertical member 3.

The design of the shoes 7 in FIG. 2 will normally be multi-part because of the need to assemble them around the intersection points. FIGS. 6a to l show some examples of such shoes.

Figure 6A:
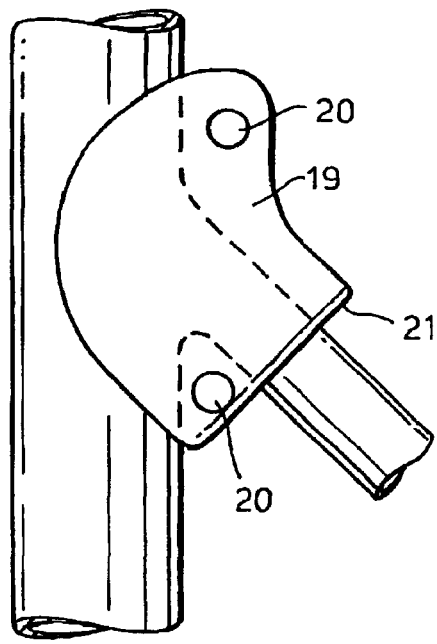
FIGS. 6a to l show embodiments of load carrying shoes for use at and around tube intersections according to the invention.
Figure 6B:
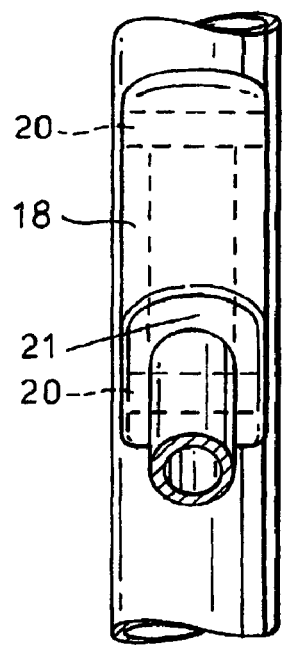

FIGS. 6a and b show front and corresponding side views of a shoe 19 split vertically and held together by horizontal pins or screws 20. This arrangement presents a surface 21 normal to the axis of the diagonal member against which the SMA shim (not shown) can bear.

Figure 6C:
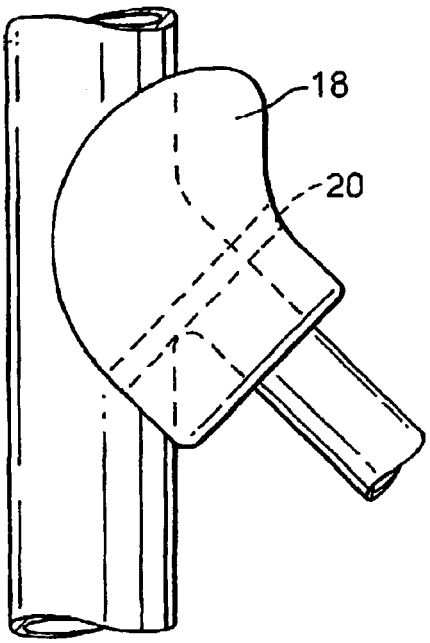
Figure 6D:
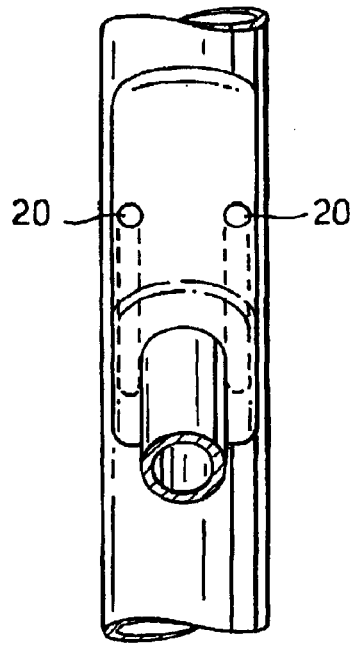

FIGS. 6c and d show front and corresponding side views of a similar shoe split into upper and lower parts which are pinned or screwed together.

Figure 6E:
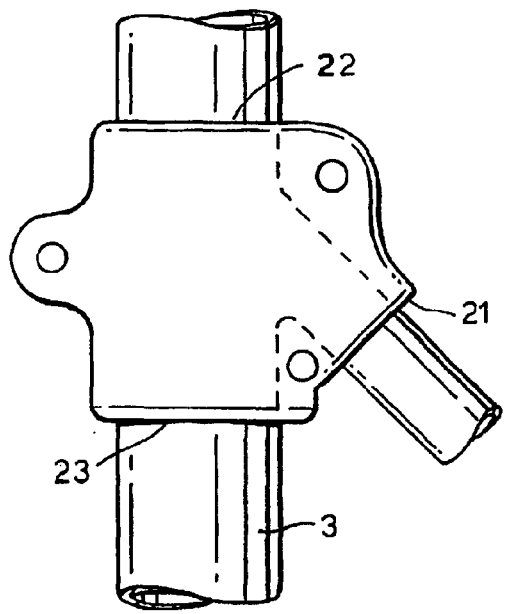
Figure 6F:
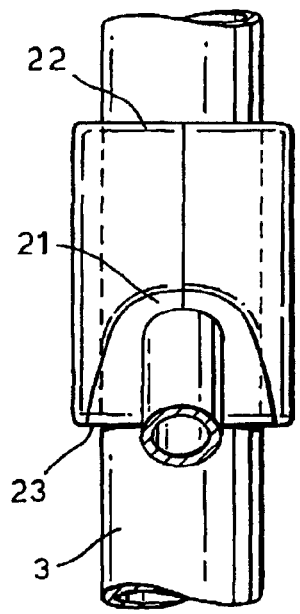

FIGS. 6e and f show front and corresponding side views of a shoe arrangement suitable for reinforcing the vertical member as well as the diagonal member. Thus auxiliary members (not shown) can bear against surfaces 21,22 and 23.

Figure 6G:
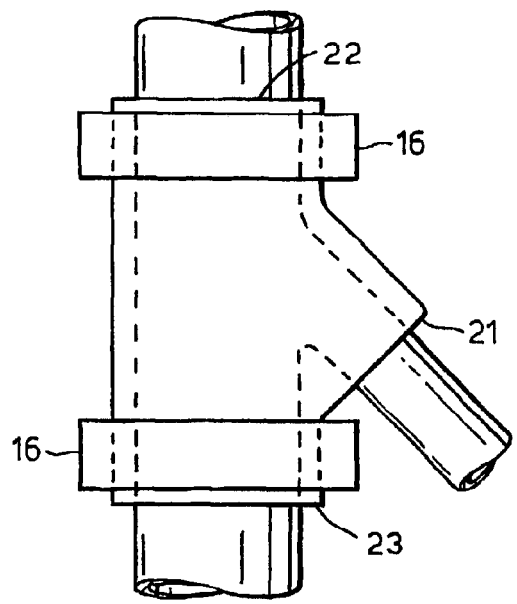
Figure 6H:
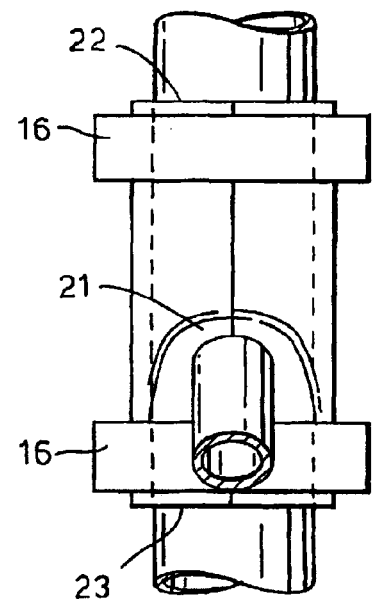

FIGS. 6g and h show front and corresponding side views of a similar arrangement in which the two parts of the shoe are held together by external clamps 16, including any of types shown in FIGS. 3b to f, instead of or as well as pins and screws.

Figure 6I:
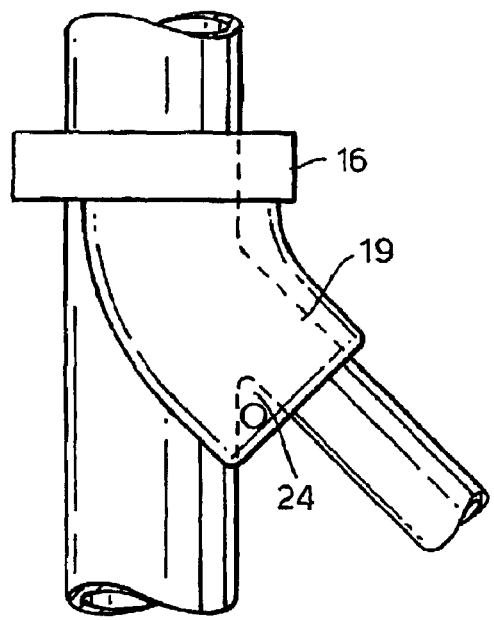
Figure 6J:
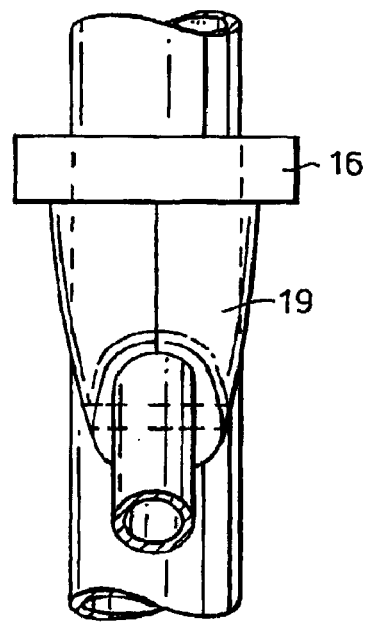

FIGS. 6i and j show front and corresponding side views of an arrangement in which the shoe 19 bears against a vertical clamp 16. The load is transferred to the vertical member 3 through the clamp and through the "elbow" of the intersection 24. This arrangement has the advantage that the shoe parts do not necessarily have to be a good fit around the intersection.

Figure 6K:
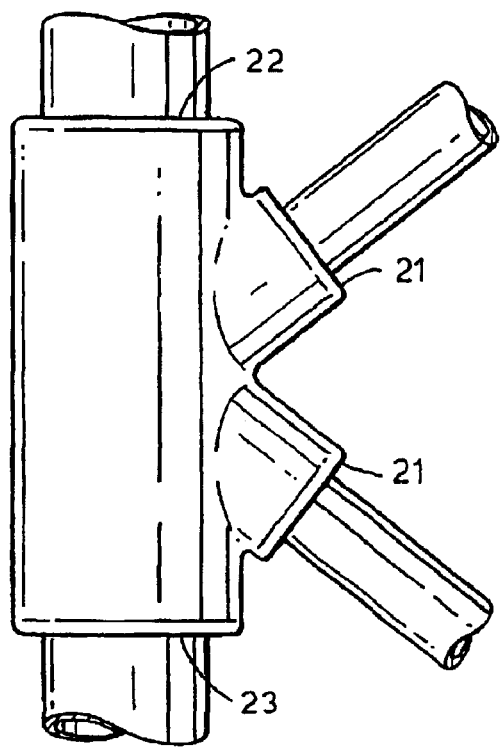
Figure 6L:
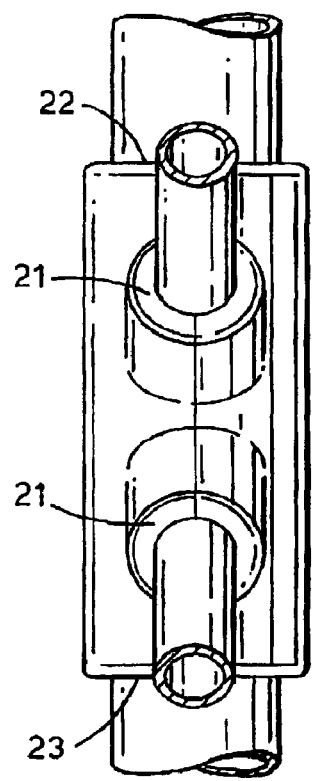

FIGS. 6k and l show front and corresponding side views of an arrangement suitable for an intersection between a vertical member 3 and two diagonal members that allow all three to be reinforced through bearing on surfaces 21, 22 and 23.

Figure 7:
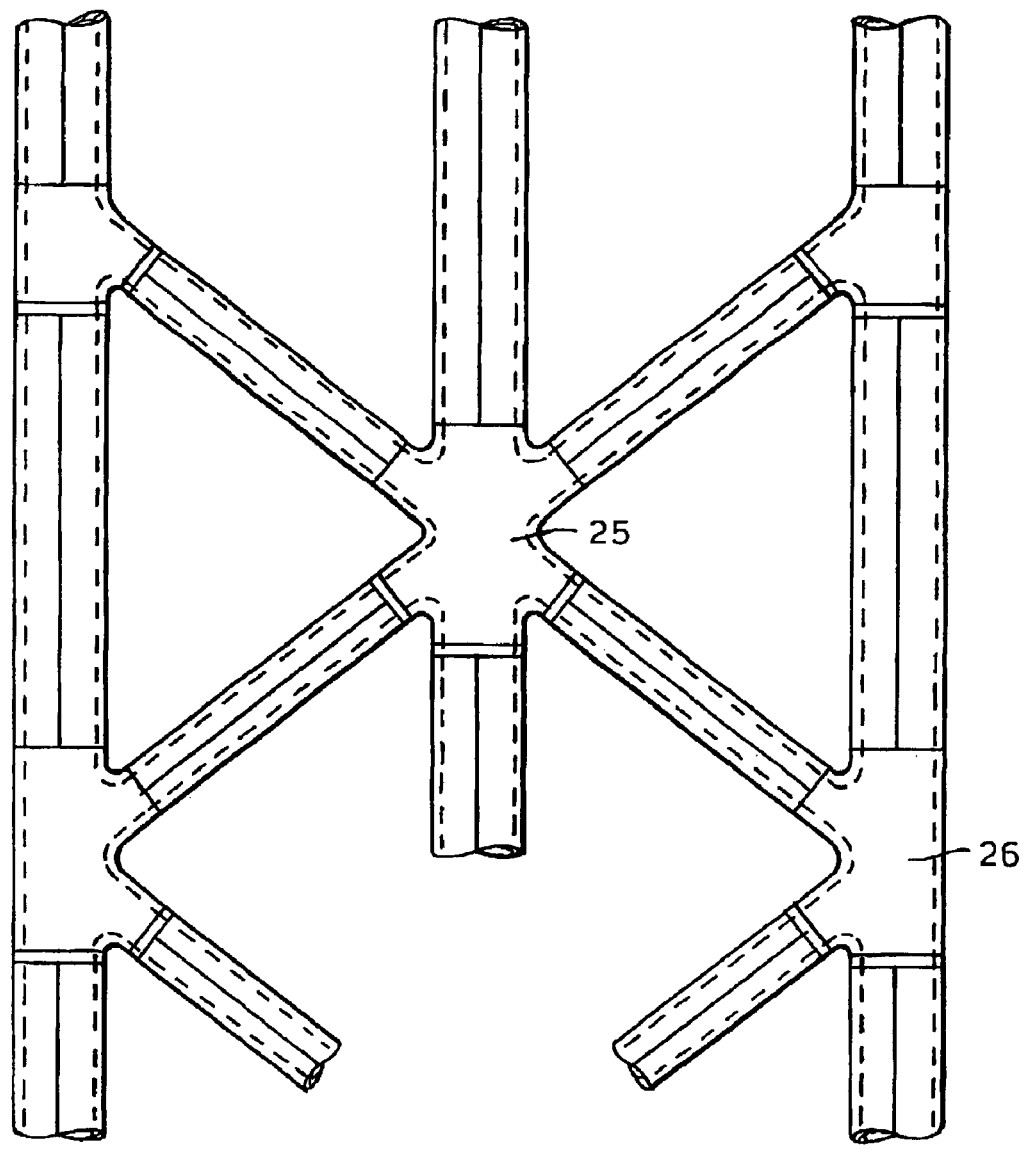
FIG. 7 shows how a complete compressive tubular structure might be reinforced using the techniques described.

In principle, a whole tubular structure can be reinforced using the previously stated principles. FIG. 7 shows an example of this. It will be apparent that approximately balanced loading from the various directions, as occurs on items 25 and 26, allows a lighter design of shoe than if the loads are unbalanced.

Figure 8A:
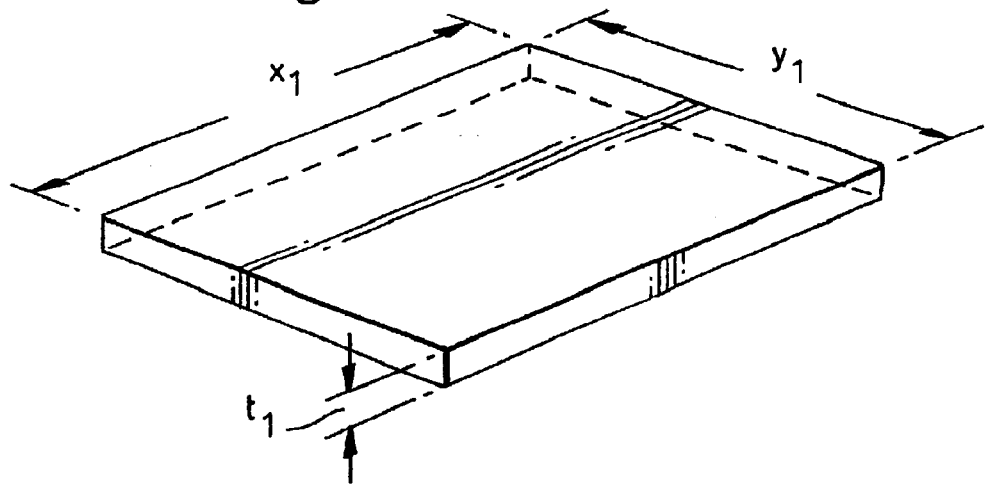
FIGS. 8a and b show how a sheet of shape memory alloy (SMA) can change shape on passing through its transition.
Figure 8B:
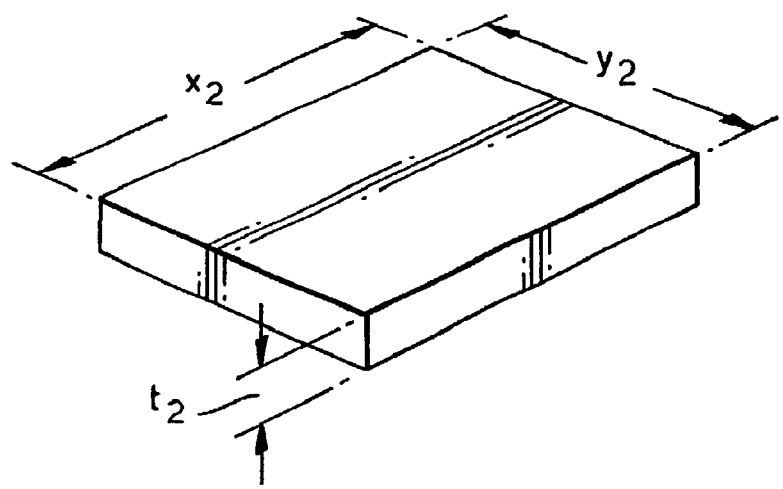

When a shape memory alloy is activated, its volume remains approximately constant. It follows that a large expansion in one direction t must be accompanied by a contraction in one or more of the other directions x, y. FIG. 8a shows an SMA sheet which is below its transition temperature. FIG. 8b shows the same SMA sheet above its transition temperature. It follows that it is possible to select a direction in which the shim would expand on cooling, and this may be more convenient for some purposes. Shape memory alloys with higher transition temperatures are also feasible, so that compositions that can be formed and stored at temperatures higher than liquid nitrogen temperatures are possible.

All the examples described above refer to structures consisting largely of circular tubes. It will be apparent to a skilled person that many of the principles are applicable to non-circular tubes or solid sections; particularly the type of reinforcement shown in FIG. 2.

Figure 9:
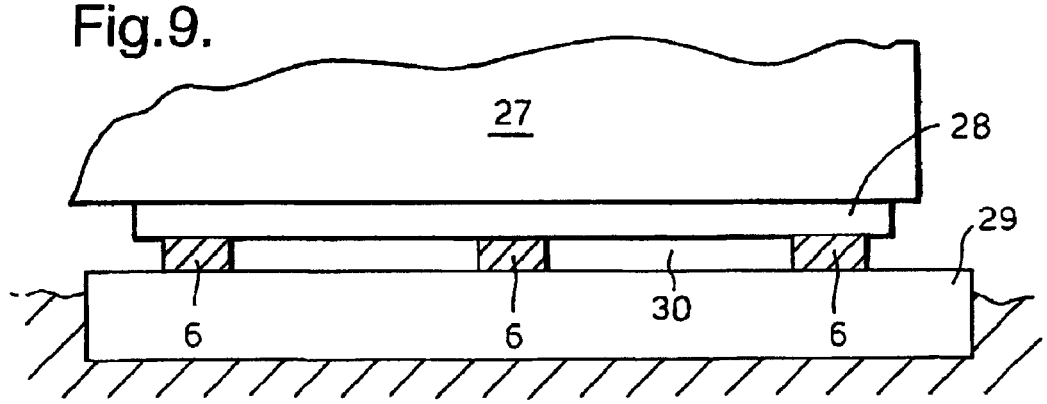
FIG. 9 shows how a wall or building might be underpinned using the techniques described.

Another example is the use of SMA expanding shims for underpinning a wall 27 or part of a building, as shown in FIG. 9. Supporting beams 28 and 29 can be jacked apart using SMA shims 6 to achieve a prescribed vertical displacement. Such shims, when activated, can remain in place permanently or be removed once a suitably strong filler has been inserted in the gap 30.

Figure 10A:
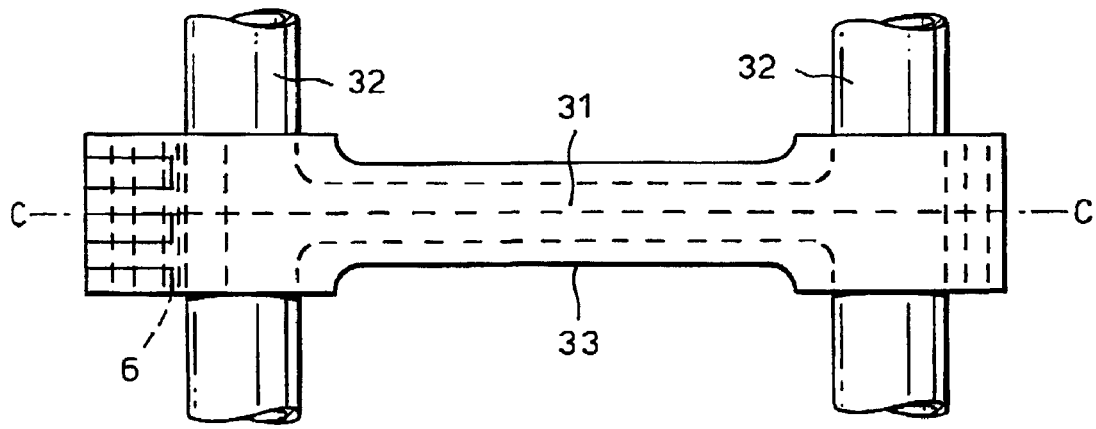
FIGS. 10a to c show how a tensile member can be reinforced using the techniques described.
Figure 10B:
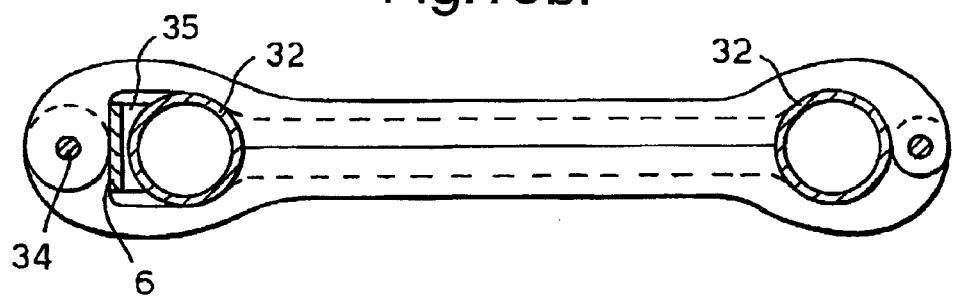

Another example is the use of SMA expanding shims to reinforce a tensile member within a structure. FIGS. 10a and 10b show a lateral front elevation and a cross-section through C—C respectively of a member 31 under tensile load imparted to it by two other members 32. Here the method of reinforcement is to introduce a tensile reinforcing member 33, which for the purposes of assembly is split, as in previous examples, and held together at 34 with pins or bolts. The new member embraces the members 31 and 32 in such a way that SMA shims 6 can be inserted in an appropriate gap at one or both ends. When activated, the SMA shim transfers compressive load through an adapter shoe 35 between member 32 and the new member 33. In this way member 33 is driven into a state of tension, thereby relieving the tension in member 31.

Figure 10C:
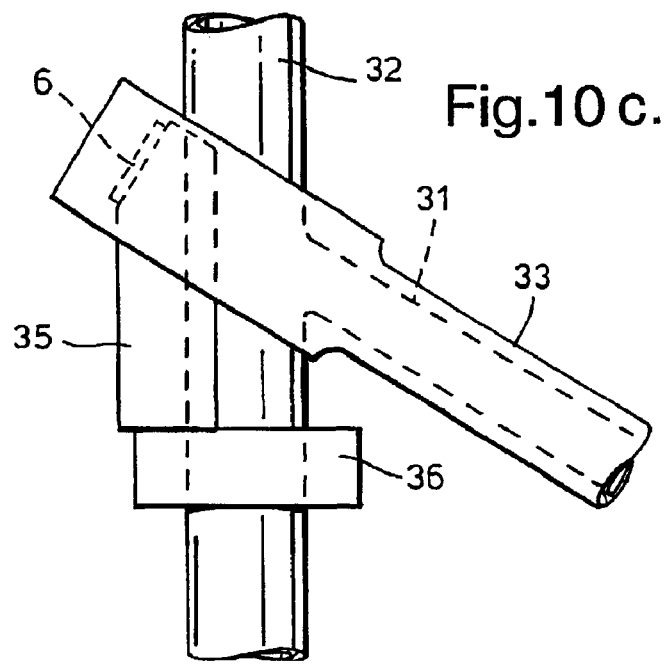

The interleaved, pinned joint shown in FIGS. 10a to c is only one of many methods by which the parts of member 33 are held together. Other alternatives are a strap or overwrinh over the cylindrical section of 33 or simple bolted joints.

The purpose of the adaptor shoe 35 is to provide a second flat surface for the shim to bear against. Its other surface conforms to that of member 32. If member 32 were of rectangular section then item 35 might be dispensed with.

The same reinforcement principle is applicable to an oblique tensile member. FIG. 10c shows a method of achieving this. The adapter shoes 35 are modified to provide a surface for the SMA shims to bear against, which is perpendicular to the axis of member 31. Member 35 in this situation will be subjected to a component of load along the direction of member 32 (downwards in the figure). If member 31 is almost perpendicular to member 32 (that is the degree of obliquity is small) then friction between members 35 and 32 may be sufficient to transfer this load. If however, the obliquity angle is larger then member 35 will require a feature to bear against. This might be accomplished by fixing item 35 securely to item 33. The axial load would then be transferred through the junction between members 32 and 33. This might, however, introduce an unacceptably large shear load at that junction. An alternative shown in FIG. 10c is to extend item 35 so that it bears on a collar 36. This collar may be of conventional design or any of the clamps shown in FIG. 3.

Another example is the use of SMA expanding shims to reinforce a member subject to torsional loading within a structure. FIGS. 11a and 11b show lateral front and side elevations of a member 37 under torsional load imparted to it by two other members 38. FIG. 11c shows a cross-section through D—D (FIG. 11b). Here the method of reinforcement is to introduce a torsional reinforcing member 39, which for the purposes of assembly is split, as in previous examples. The new member has extended lobes 40 such that SMA shims 6 can be inserted in appropriate gaps at some distance off the axis of member 37. Adapter shoes 35 would be used as in the previous example. When activated, the SMA shims apply a torsional load to member 39 through lobes 40, thereby relieving some of the torsional load in member 37.

In order to withstand torsional loading the two parts of member 39 have to be secured to avoid shearing at the interface between them. In FIG. 11a, this is accomplished by inserting dowel pins 41, which would be required at various stations along member 39. It will be evident to a person skilled in the art that one of a number of methods might be used to key the two parts of member 39 together.

Figure 12A:
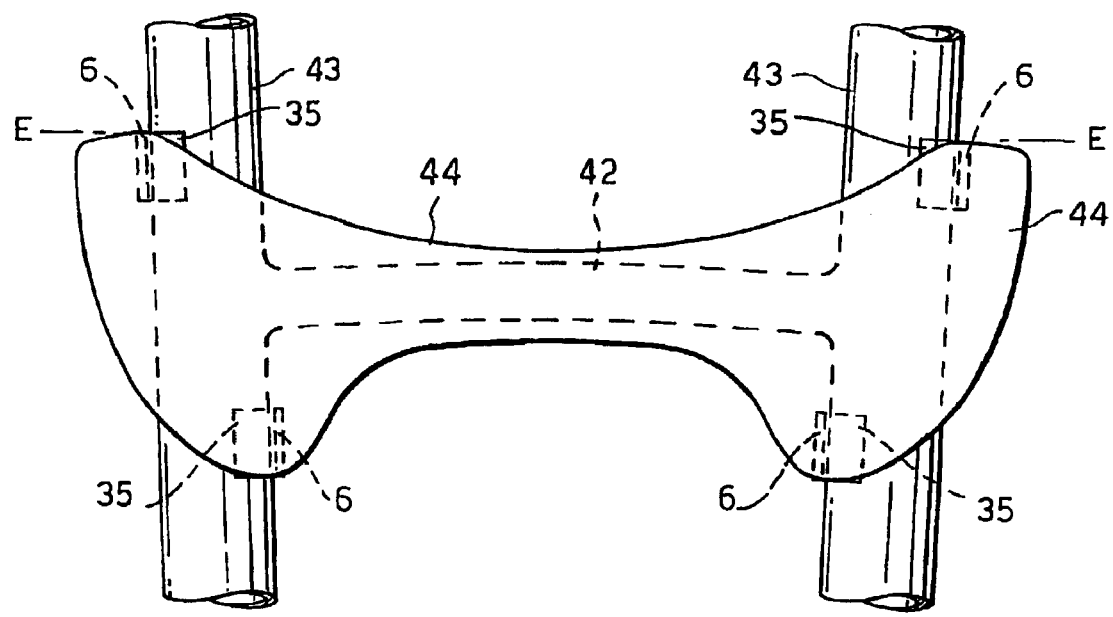
FIGS. 12a to 13b show how a member subjected to bending can be reinforced using the techniques described.
Figure 12B:
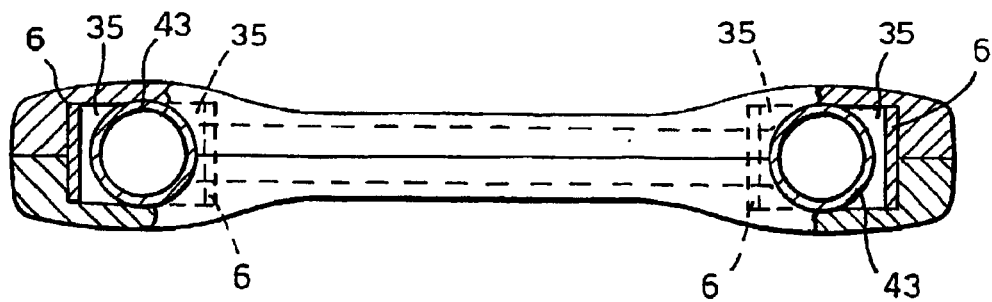

Another example is the use of SMA expanding shims to reinforce a member subject to bending loads within a structure. FIGS. 12a and 12b show a lateral front elevation and a cross-section through E—E respectively of a member 42 under bending load imparted to it by two other members 43. Here the method of reinforcement is to introduce an additional reinforcing member 44, which for the purposes of assembly is split, as in previous examples. The new member has extended lobes such that SMA shims 6 can be inserted into appropriate gaps at some distance off the axis of member 42. Adapter shoes 35 would be used as in the previous example. When activated, the SMA shims apply a bending load to member 44 thereby relieving some of the bending load in member 42.

Figure 13A:
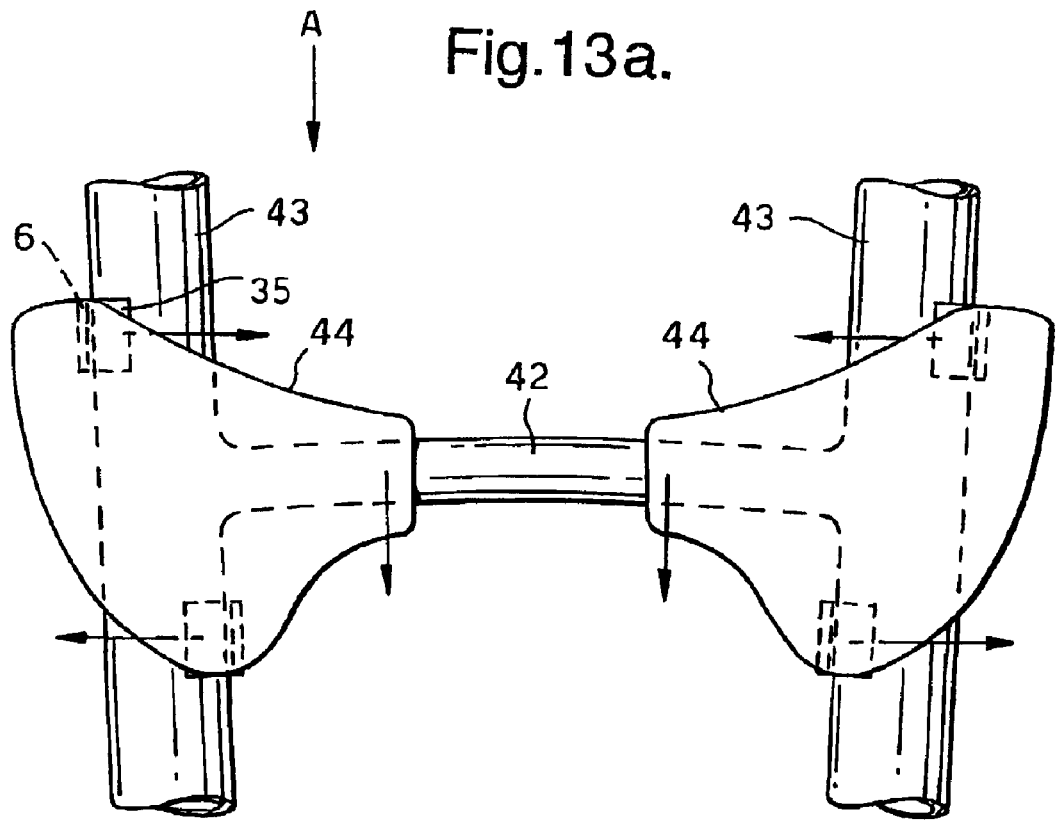
Figure 13B:
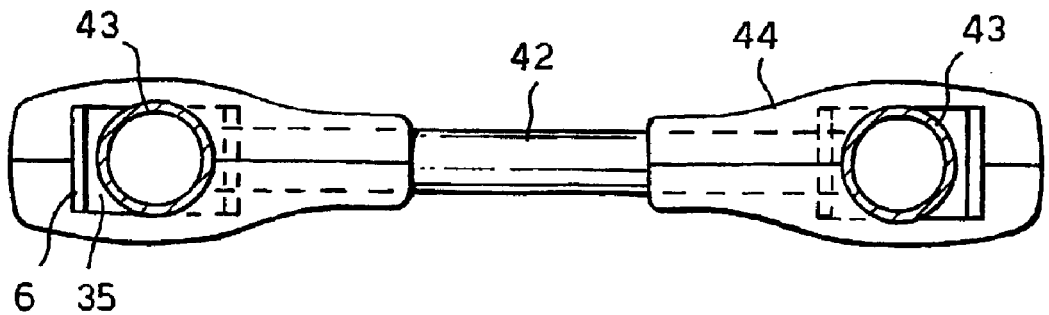

Member 44 does not necessarily have to extend the full length of member 42. FIGS. 13a and 13b show a lateral front elevation and a plan view respectively of member 44 split into two separate islands, each island then being split as in previous examples. The corrective bending loads can then be applied to member 42 by virtue of members 44 fitting closely around it in the regions where the load is applied. The arrows show the set of corrective forces exerted on the existing structure.

Figure 14:
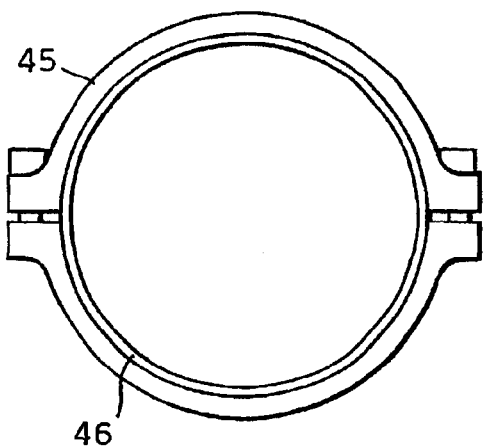
FIGS. 14a to d show alternative clamping arrangements for the reinforcement of an existing member.
Figure 14:
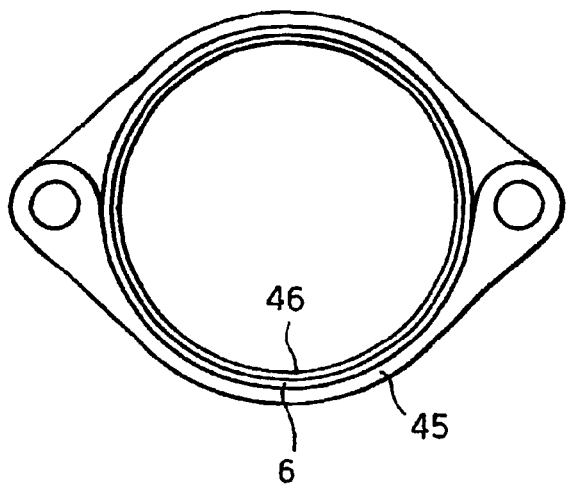
Figure 14:
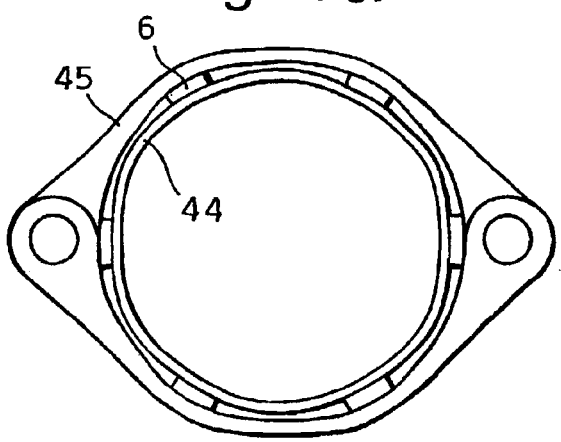
Figure 14:
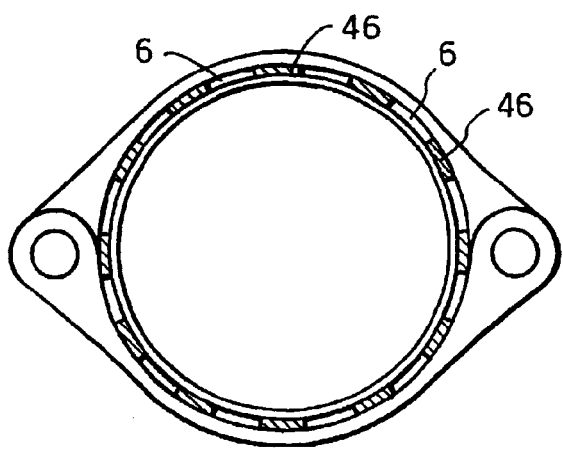

FIGS. 14a to d show further embodiments utilising the clamping concept. FIG. 14a shows a clamp 45 around a pipe 46, without the use of SMA shims. In general, SMAs are capable of exerting considerably more compressive stress than is needed to activate the clamp (for thin walled tubes, typically by a factor of 20). Thus if used to apply uniform pressure around the circumference of a pipe 46, as shown in FIG. 14*b*, the SMA 6 is capable of collapsing the pipe in compression or breaking the clamp 45 in tension. To avoid these eventualities, the design would have to ensure that the SMA was unable to develop sufficient displacement to do this (i.e. it would run out of stroke). Using SMA all round the pipe, however, is somewhat wasteful of the relatively expensive SMA material.

A more economical use of the SMA is as discrete "islands" of shim 6, as in FIG. 14*c*. Here the average pressure (averaged around the circumference of the pipe) is sufficient for effective clamping, but both the clamp 45 and the pipe 46 are subject to bending. To compensate for this, the clamp ring would have to be thicker than would otherwise be the case. In addition the pipe is more difficult to grip.

The use of inert packing pieces 46, as well as the active SMA shims 6, as shown in FIG. 14*d*, provides a partial solution to this. The bending loads in the clamp are partially relieved, and the pressure applied to the pipe is more uniform.

Figure 15:
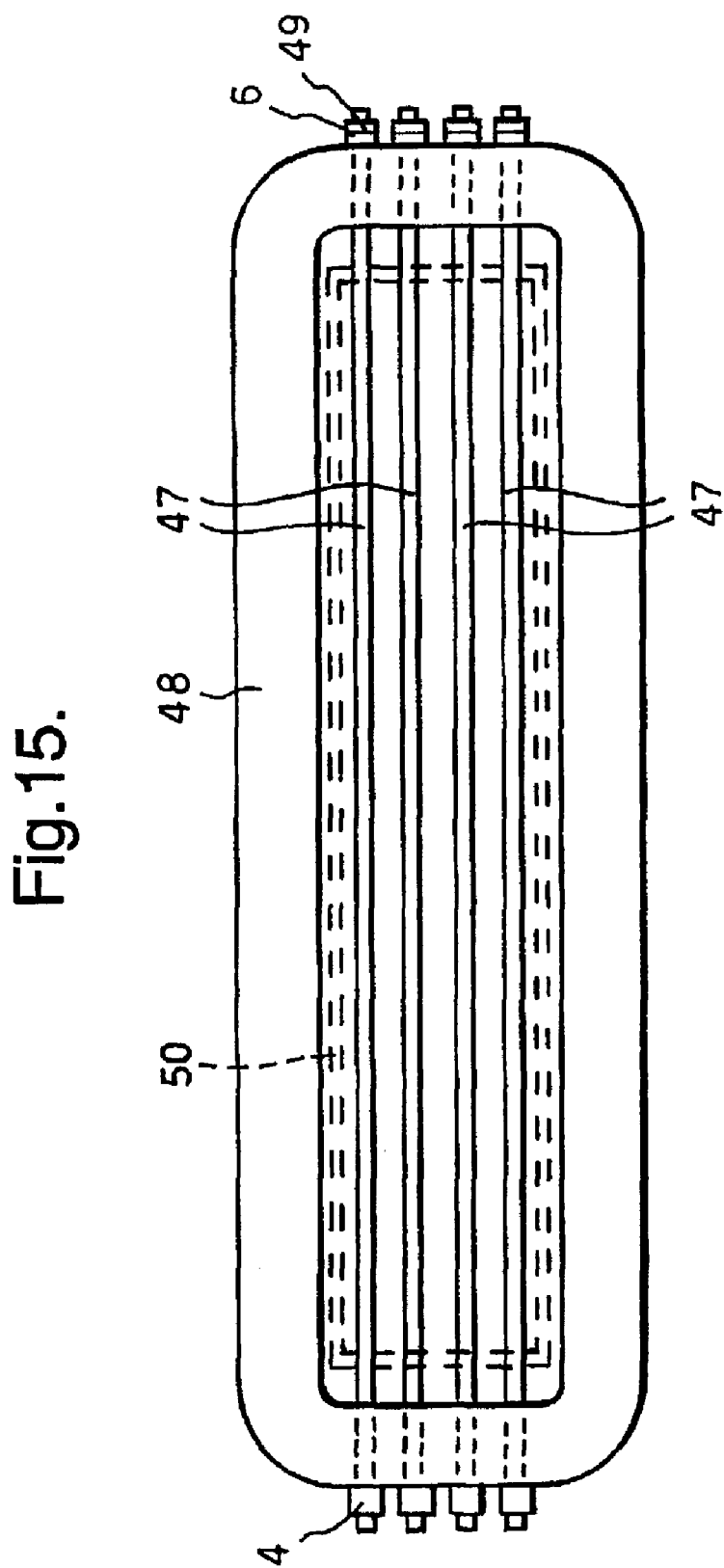
FIG. 15 shows an embodiment of the invention reinforcing pre-stressed concrete.

FIG. 15 shows how the principle of reinforcing a tensile member can be used to construct components in materials such as pre-stressed concrete in the field, without the need for jacking devices.

The reinforcing rods 47 are set in a strong frame 48, through whose ends they pass. The ends of the rods are secured, e.g. by nuts and washers or welded on lugs 49. SMA shims 6 are inserted between items 49 and one or both ends of the frame. When the SMA is activated, the rods are drawn into tension. The concrete is then cast into a box or shuttering, item 50.

After the concrete has set and the box and frame have been dismantled, a pre-stressed reinforced concrete beam results.

What is claimed is:

1. A method of generating force between a structure and an additional member, said additional member comprising one or more units, said method comprising:
   a) inserting one or more pre-cooled or pre-heated shim(s) of shape memory alloy between said additional member and said structure or, inserting said shim(s) between at least two of said units, or, additionally fixing one or more shoes to said structure and inserting said shim(s) between said shoe(s) and said additional member; each said shim being a generally laminar element adapted to expand in thickness on warming or cooling through a transition temperature; and
   b) allowing said shim(s) to expand in thickness on subsequent warming or cooling so as to apply a compressive force to respective portions of said structure, additional member or shoe(s) in contact with the opposite sides of respective said shim(s).

2. A method as claimed in claim 1 wherein said additional member has an outer surface that generally conforms to the shape of the inner surface of an existing structural member of said structure.

3. A method as claimed in claim 2 wherein said existing structural member is tubular.

4. A method as claimed in claim 2 wherein in step a) the shim(s) are inserted between the inner surface of said existing structural member and the outer surface of the additional member.

5. A method as claimed in claim 2 wherein said additional member comprises at least two sub-units, said shim(s) being inserted between said sub-units.

6. A method as claimed in claim 1 wherein said additional member has an inner surface that generally conforms to the shape of the outer surface of an existing structural member of said structure.

7. A method as claimed in claim 6 wherein said additional member is a hoop.

8. A method as claimed in claim 7 wherein the additional member comprises an external bracket or clamp.

9. A method as claimed in claim 1, wherein said structure is a tubular, offshore structure.

10. A method as claimed in claim 1 wherein said additional member is attached to said structure by virtue of the forces generated by expansion of said shim(s).

11. A method as claimed in claim 10 wherein said additional member reinforces said structure such as to share existing load in said structure.

12. A method as claimed in claim 11 wherein said structure is a tubular offshore structure.

13. A method as claimed in claim 1 wherein said structure is part of a building and said shim(s) are inserted between a pair of beams located beneath said structure to underpin the structure.

14. A method as claimed in claim 1, wherein said structure is a frame surrounding a space for concrete to be cast and a plurality of said additional members comprise rods extending through said space and frame which are placed into tension by the expansion of shims inserted between said frame and abutments on said rods, prior to the setting of concrete within said space.

15. A method of generating force between a structure and an additional member, said additional member comprising one or more units, said method comprising:
   a) inserting one or more shim(s), at ambient temperature, of a shape memory alloy between said additional member and said structure, or, inserting said shim(s) between at least two of said units, or, additionally fixing one or more shoes to said structure and inserting said shim(s) between said shoe(s) and said additional member; each said shim being a generally laminar element adapted to expand in thickness on warming through a transition temperature and to remain in the expanded state on cooling to ambient temperature; and
   b) causing said shim(s) to expand in thickness on subsequent warming so as to apply a compressive force to respective portions of said structure, additional member or shoe(s) in contact with the opposite sides of respective said shim(s), wherein said shim(s) remains in the expanded state on cooling to ambient temperature.

16. A method as claimed in claim 15 wherein said additional member has an outer surface that generally conforms to the shape of the inner surface of an existing structural member of said structure.

17. A method as claimed in claim 16 wherein said existing structural member is tubular.

18. A method according to claim 15 wherein said additional member has an inner surface that generally conforms to the shape of the outer surface of an existing structural member of said structure.

19. A method as claimed in claim 18 wherein said additional member is a hoop.

20. A method as claimed in claim 19 wherein the additional member comprises an external bracket or clamp.

21. A method as claimed in claim 15, wherein said structure is a tubular, offshore structure.

22. A method as claimed in claim 15 wherein said additional member is attached to said structure by virtue of the forces generated by expansion of said shim(s).

23. A method as claimed in claim 22 wherein said additional member reinforces said structure to share existing load in said structure.

24. A method as claimed in claim 23 wherein said structure is a tubular offshore structure.

25. A method as claimed in claim 15 wherein said structure is part of a building and said shim(s) are inserted between a pair of beams located beneath said structure to underpin the structure.

26. A method as claimed in claim 15, wherein said structure is a frame surrounding a space for concrete to be cast and a plurality of said additional members comprise rods extending through said space and frame which are placed into tension by the expansion of shims inserted between said structure and abutments on the rods, prior to the setting of concrete within said space.

* * * * *